(12) United States Patent
Nikitin et al.

(10) Patent No.: US 8,249,854 B2
(45) Date of Patent: Aug. 21, 2012

(54) INTEGRATED NATIVE LANGUAGE TRANSLATION

(75) Inventors: Egor Nikitin, Bellevue, WA (US); Alexander Frank, Bellevue, WA (US); Yannis Dosios, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 11/137,894

(22) Filed: May 26, 2005

(65) Prior Publication Data

US 2006/0271352 A1 Nov. 30, 2006

(51) Int. Cl.
*G06F 17/28* (2006.01)
*G06F 12/10* (2006.01)

(52) U.S. Cl. ............ 704/2; 704/8; 704/9; 704/3; 704/4; 704/251

(58) Field of Classification Search ............... 704/2, 251, 704/7–9, 260
See application file for complete search history.

(56) References Cited

U.S. PATENT DOCUMENTS

| | | | |
|---|---|---|---|
| 4,159,536 A | | 6/1979 | Kehoe et al. |
| 5,608,622 A * | | 3/1997 | Church ............... 704/3 |
| 5,768,603 A * | | 6/1998 | Brown et al. ............. 704/9 |
| 5,826,219 A * | | 10/1998 | Kutsumi ................. 704/4 |
| 5,845,143 A * | | 12/1998 | Yamauchi et al. ............ 704/2 |
| 5,917,944 A * | | 6/1999 | Wakisaka et al. ............ 382/190 |
| 5,987,401 A * | | 11/1999 | Trudeau ................. 704/2 |
| 5,987,402 A * | | 11/1999 | Murata et al. ............. 704/2 |
| 6,092,035 A * | | 7/2000 | Kurachi et al. ............ 704/3 |
| 6,119,078 A * | | 9/2000 | Kobayakawa et al. ........... 704/3 |
| 6,148,105 A * | | 11/2000 | Wakisaka et al. ............. 382/190 |
| 6,275,789 B1 * | | 8/2001 | Moser et al. .............. 704/7 |
| 6,393,389 B1 * | | 5/2002 | Chanod et al. ............. 704/7 |
| 6,470,306 B1 * | | 10/2002 | Pringle et al. ............. 704/3 |
| 6,665,642 B2 * | | 12/2003 | Kanevsky et al. ............ 704/260 |
| 6,857,022 B1 * | | 2/2005 | Scanlan ................. 709/229 |
| 6,985,850 B1 * | | 1/2006 | Scanlan ................. 704/2 |
| 6,996,520 B2 * | | 2/2006 | Levin .................. 704/10 |
| 7,283,949 B2 * | | 10/2007 | Shieh .................. 704/4 |
| 7,398,198 B2 * | | 7/2008 | Hess et al. ............... 704/2 |
| 2002/0002452 A1 * | | 1/2002 | Christy et al. ............ 704/3 |
| 2002/0071593 A1 * | | 6/2002 | Muratani ................ 382/100 |
| 2002/0156902 A1 * | | 10/2002 | Crandall ................ 709/228 |
| 2002/0169592 A1 * | | 11/2002 | Aityan .................. 704/2 |
| 2003/0084142 A1 * | | 5/2003 | Casati et al. .............. 709/224 |
| 2003/0176995 A1 * | | 9/2003 | Sukehiro ................ 704/2 |
| 2004/0236670 A1 | | 11/2004 | Hara |

OTHER PUBLICATIONS

International Search Report for PCT/US06/20370 mailed Jan. 16, 2008.
Written Opinion for PCT/US06/20370 mailed Jan. 16, 2008.

(Continued)

*Primary Examiner* — Pierre-Louis Desir
*Assistant Examiner* — Abdelali Serrou

(57) ABSTRACT

A method and apparatus provide for performing language translation by obtaining a selection of a language preference for presentation of text and/or speech on an electronic device. When data is received that includes content in a language other than the preferred language, a decision whether translation is required may be reached by analyzing the context of the language or metadata associated with the language, such as. HTML tags, or language data included in a particular protocol, e.g. HTTP headers. A selection may be made of billing level, determined at least in part by the languages involved, desired accuracy, latency and volume of translation. If necessary, the data may be routed to a translation host or service before final presentation.

10 Claims, 7 Drawing Sheets

OTHER PUBLICATIONS

Draft Office Action Response for China Patent Application CN1551027A 2004-12-001, discussing U. S. patent publication 2004/0236670, listed above.

Murata et al., "WWW machine translation system that supports the Internet surfing comfortably", Technical Report of IEICE, May 25, 1995, vol. 95, No. 77, pp. 31-36.

* cited by examiner

INTEGRATED NATIVE LANGUAGE TRANSLATION

BACKGROUND

Browsing the Internet has become a commonplace experience in Western Culture. Hundreds of millions of pages of Internet content are downloaded each day. However, the vast majority of Internet sites are composed in English, with many others available in more popular languages such as French, German and Chinese, to name a few. When the person viewing a web page, or other Internet content is not well versed in English, for example, they are not able to make use of that content and are cut-off from vast amounts of information. Similarly, someone fluent in English may be able to locate much needed information, but if the content is in a foreign language it may be of limited use or, worse, no use at all.

Word-by-word and even paragraph level translators are available for a limited number of languages on the web. The process for using them is tedious. The content must be copied, a translation web site found and opened, the text pasted into the translation web site, a selection of 'to' and 'from' language made and the process started. he user must then correlate the translation to that portion of the original web site to discern the meaning. Standalone translation devices are also available but also suffer from some of the same limitations as above, where text must be typed or pasted into the device before matching words or phrases in the other language are displayed.

SUMMARY

Integrated native language browsing allows a user to identify a target language for presentation of data. A browser, plug-in, or other application, residing locally or on a server, such as an edge server or proxy server, may review received data for language content. When the language of the received data is substantially foreign, a translation to the target language may be automatically invoked. Thus, the user does not have to explicitly cut and paste text into a translator, but rather may have an entire page presented in the target language in its original context.

The translation may be selected from a range of different translation accuracies and prices depending on the preferences and requirements. After translation, the web page or other data may be presented in the native language. A banner or other notification may be used to alert the user that the page was translated. When small regions of non-native text are encountered, they may be ignored for example, quoted material, scientific references, or foreign-language idioms.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
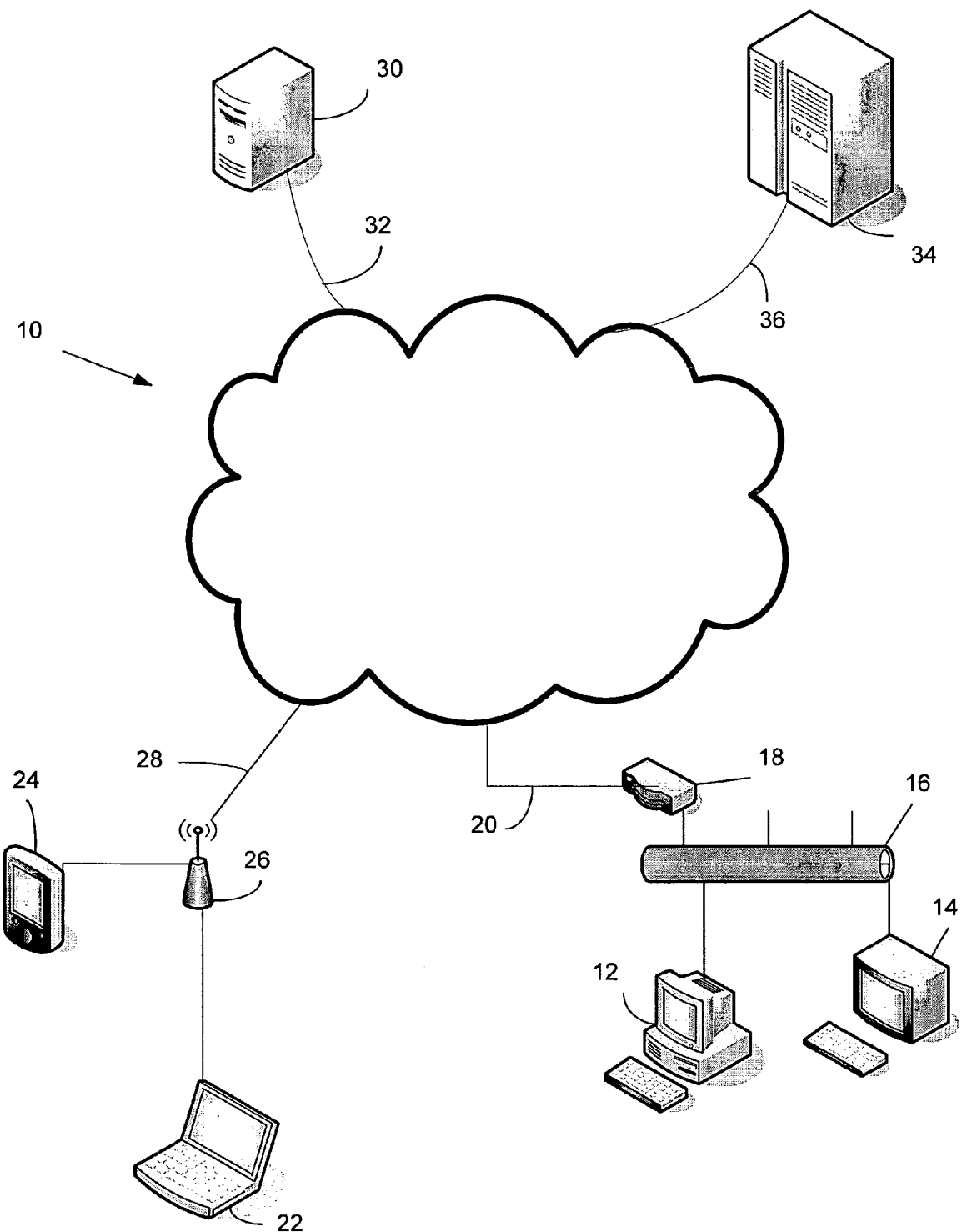
FIG. 1 is a simplified and representative block diagram of a computer network.

FIG. 1 illustrates a network 10 that may be used to implement a dynamic software provisioning system. The network 10 may be the Internet, a virtual private network (VPN), or any other network that allows one or more computers, communication devices, databases, etc., to be communicatively connected to each other. The network 10 may be connected to a computer 12, such as a personal computer and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30, such as a proxy server or edge server may be connected to the network 10 using a communication link 32 and a web server 34 may be connected to the network 10 using another communication link 36.

Figure 2:
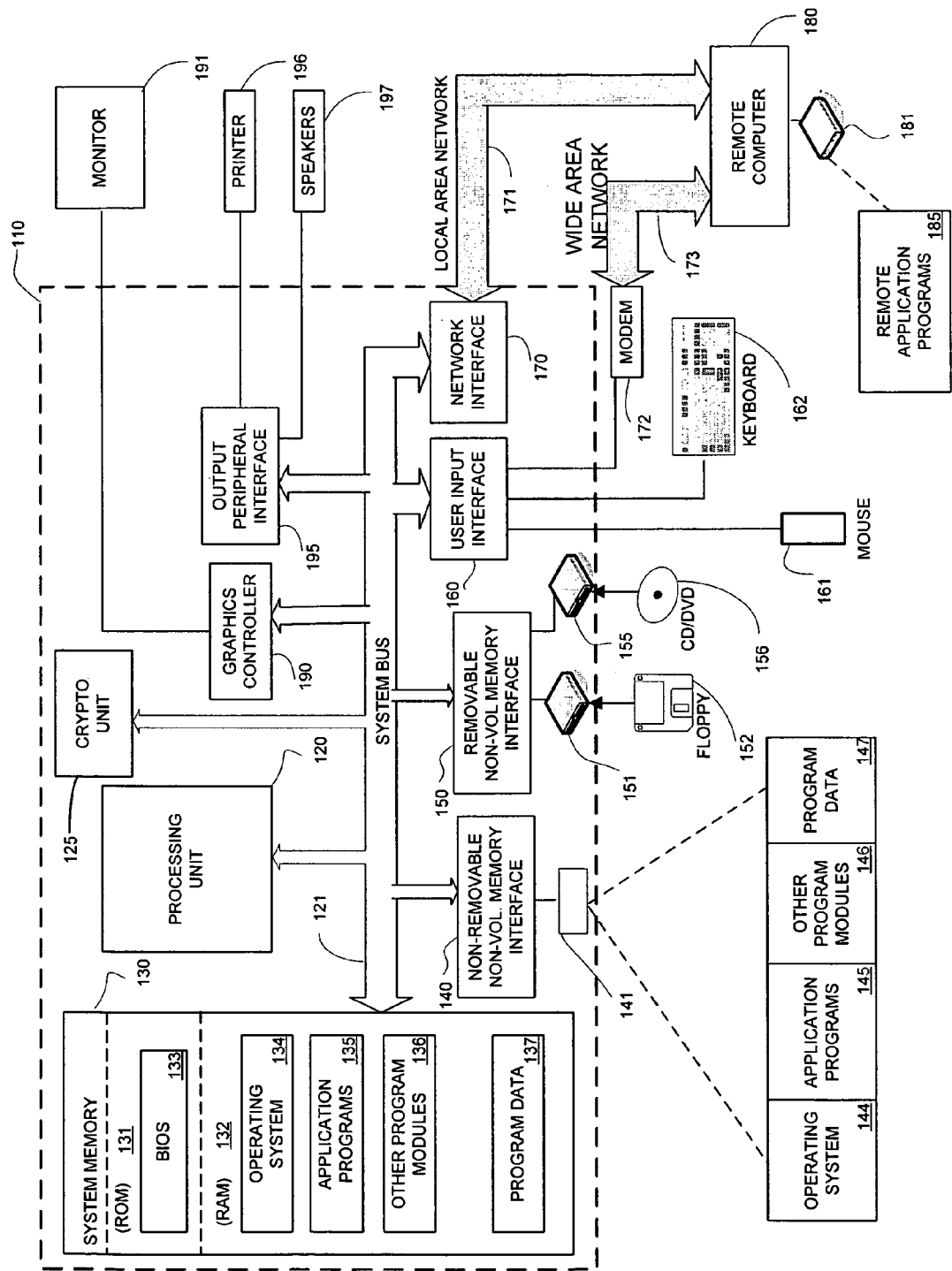
FIG. 2 is a simplified and representative block diagram of a computer.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. In other embodiments, the functions of the cryptographic unit may be instantiated in software and run via the operating system.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

FIGS. 3-6 depict the basic computer network of FIG. 1. The depiction of the transport layer connections between systems has been removed to allow a focus on the logical connections between computer 12, server 30, and server 34. Obviously, when in operation, the transport layer connections, for example, wireline or wireless connectivity must be present.

Figure 3:
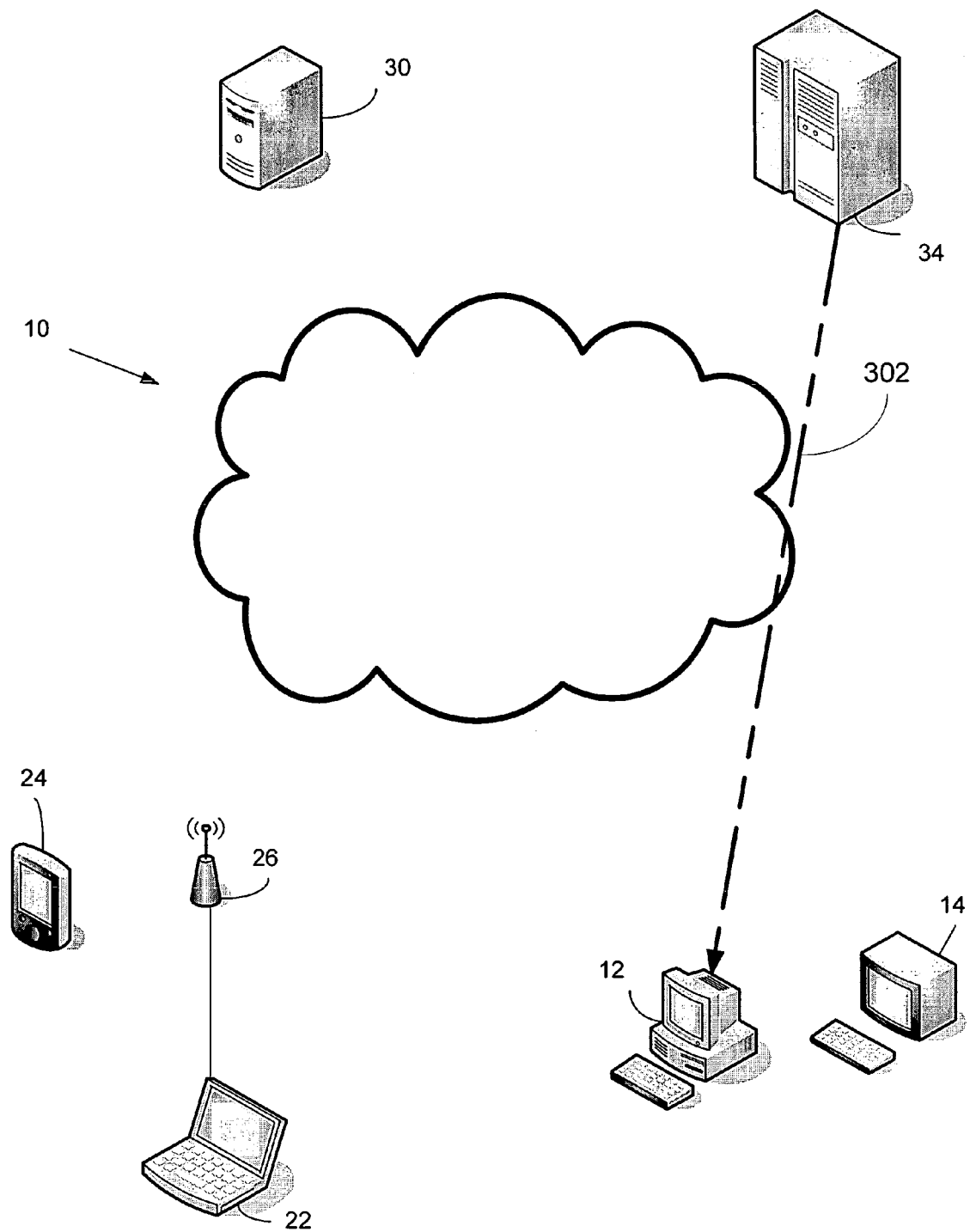
FIGS. 3-6 are simplified versions of FIG. 1 depicting data flows between computer systems.

FIG. 3 depicts a simple flow for data from a web server 34 to a computer 12, for example, in response to a universal record locator (URL) being requested by a browser on the computer 12. The response may be sent via logical connection 302. If the incoming language of the data is not the same as a pre-selected presentation or target language, a translation of the data may be made locally, that is, on computer 12. The results may be displayed and an optional notification presented that the current page has been translated. The translation may be done automatically, for example, by a plug-in in a web browser using an application program interface. In another embodiment, a user may manually trigger the translation process by selecting a menu item. In other embodiments, translation services may be available through an application, for example in a word processor, or through the operating system, again, either manually or automatically triggered. More details regarding language selection and translation types are found below with respect to FIG. 7.

Figure 4:
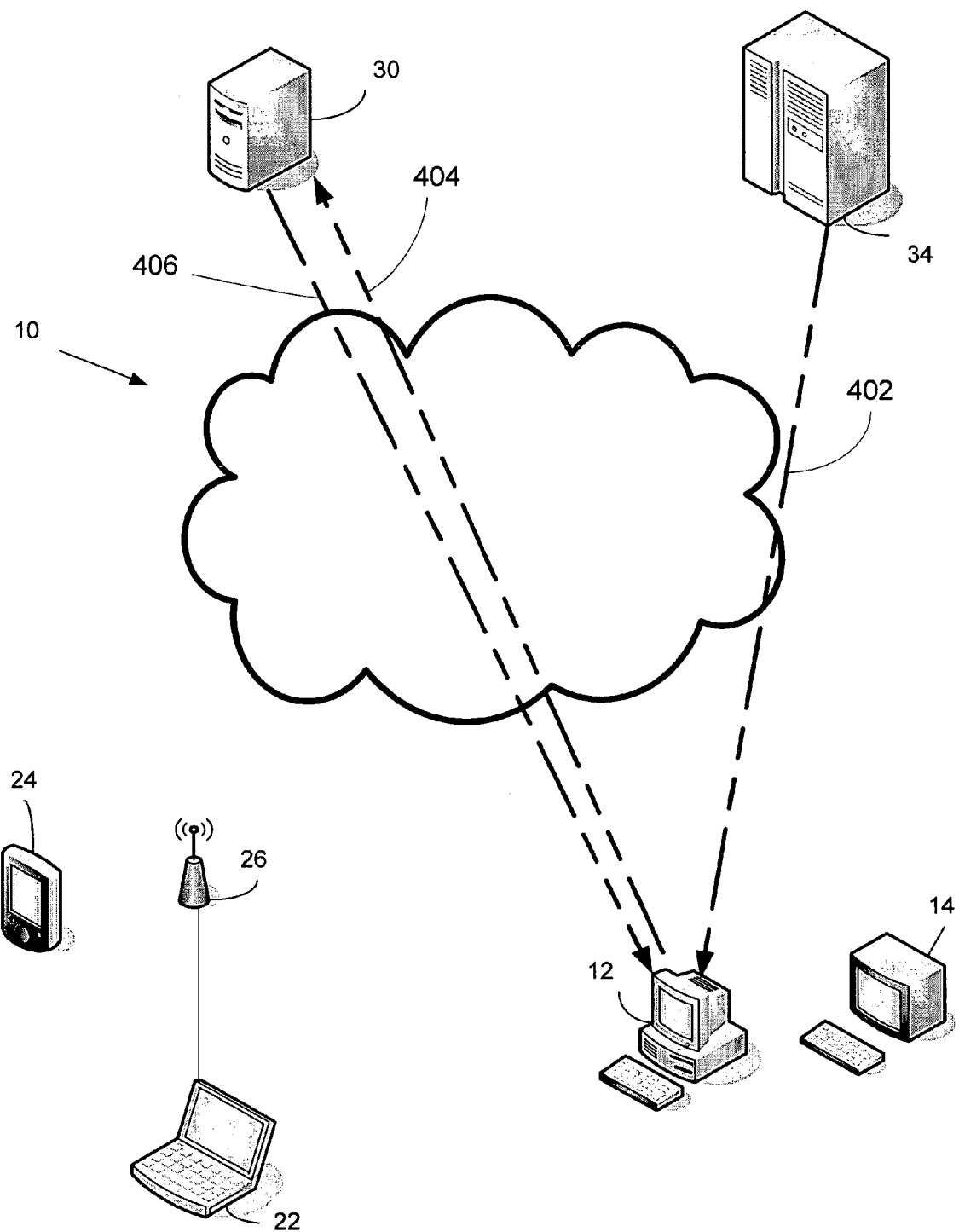

FIG. 4 depicts an alternate data flow for traffic requiring translation. Requested data is sent from the web server 34 to computer 12 via logical link 402. When the computer 12 determines that a translation is appropriate, the data, plus the preferred language selection, may be sent to a server 30 via logical data link 404. The server 30 may then perform the translation and return the processed data to the computer 12 via logical data link 406.

Figure 5:
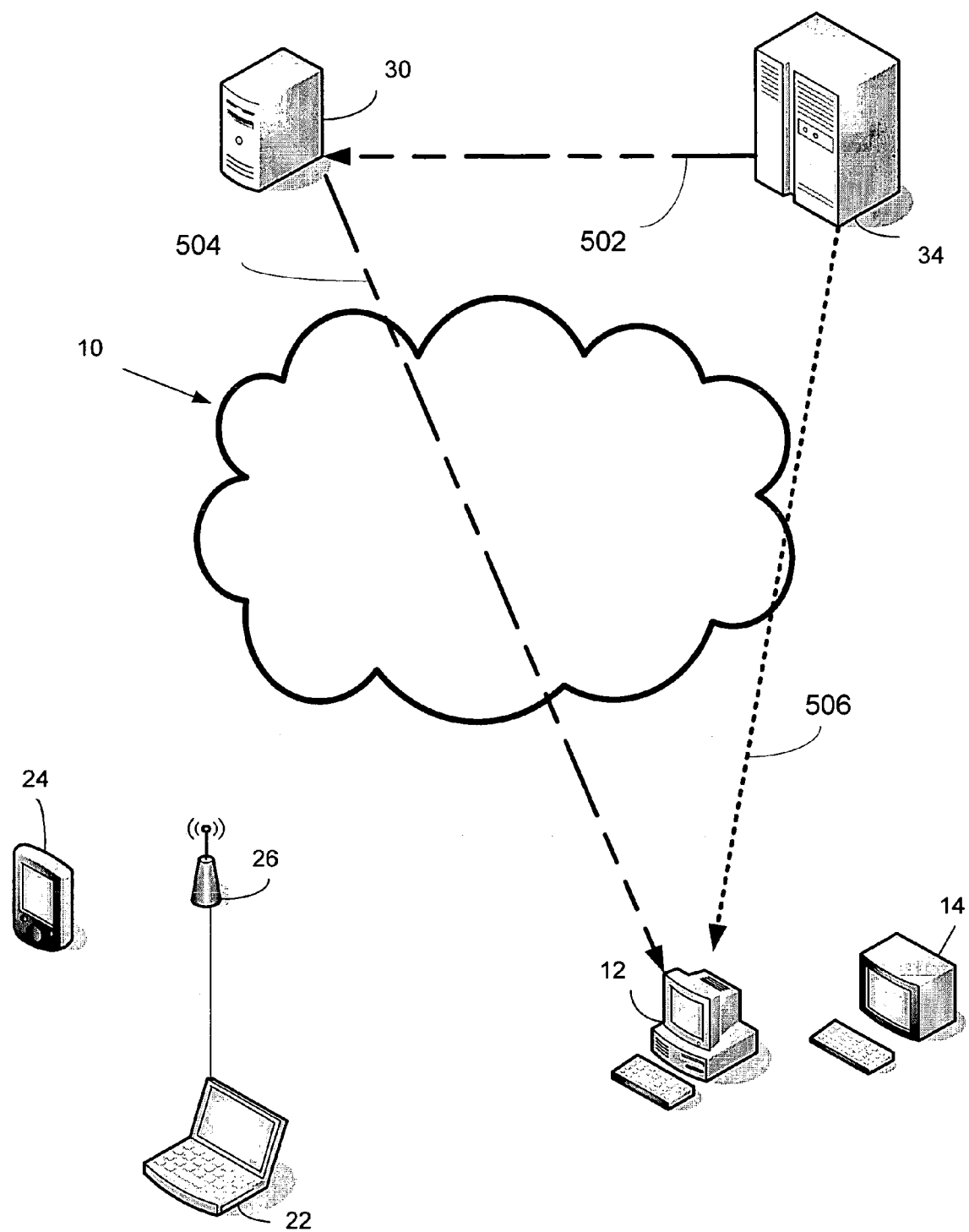

FIG. 5 depicts another alternate data flow for traffic requiring translation. With the server 30 configured as a proxy server, data requested by the computer 12 is sent from the web server 34 to the server 30. An analysis of the data may be performed at the server 30 to determine if the data content is in a language other that the preferred language. If so, the data may be translated to the preferred language and then sent to the computer 12.

In one alternative embodiment, the web server 34 may send page data directly to the computer 12, but, based on preference settings, send text or speech data components to server 30 for translation. The server 30 may then forward the translated data via logical data link 504. The computer 12 may then merge the data, for example, using page descriptors, for ultimate presentation.

Figure 6:
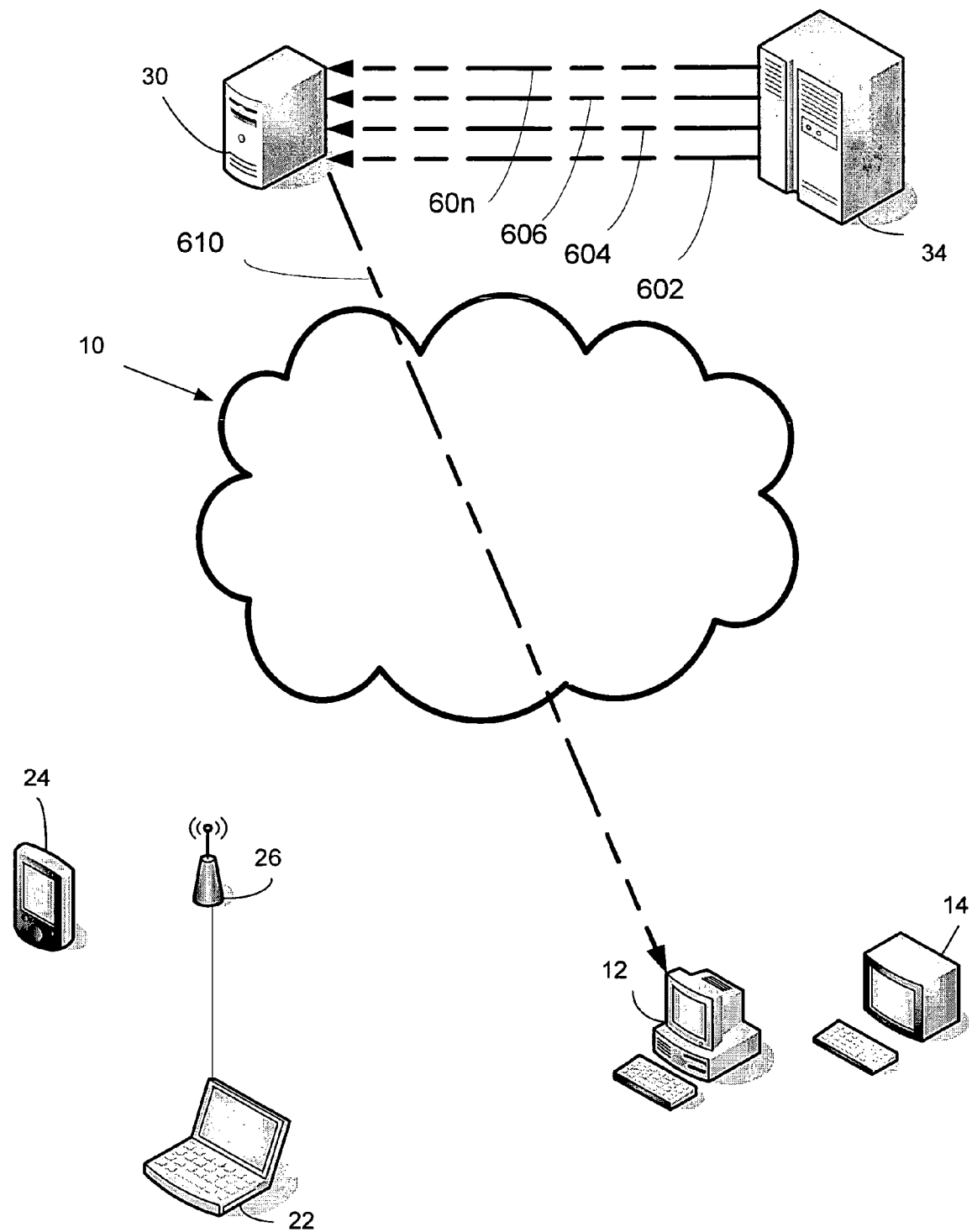

FIG. 6 depicts another alternate data flow for traffic requiring translation. The server 30 may be configured as a proxy server or as an edge server, that is, a cache of frequently requested data. Data sent in an ongoing fashion to the server 30, represented by logical connections 602, 604, 606, 60n may be cached at server 30. The data may be translated to a number of different native languages preferred by computer users coupled to that server 30. The data may be translated and cached proactively, or may be translated after a first request and cached, anticipating a subsequent requests. That choice is a business decision, based on available resources for proactive translation and storage, vs. responsiveness to an incoming request.

Figure 7:
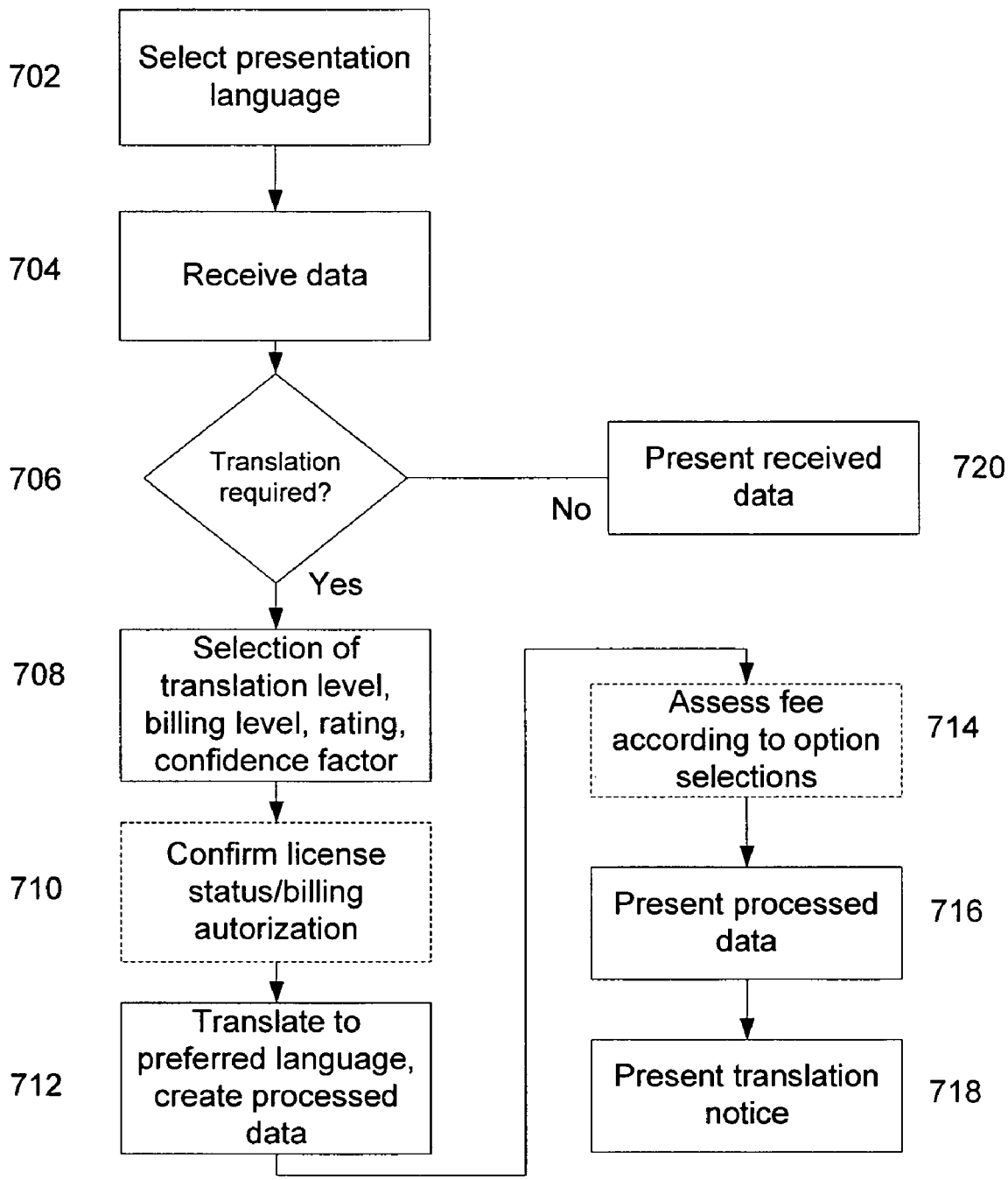
FIG. 7 is a flow chart of a method for integrating native language translation with browsing.

Referring to FIG. 7, a method of performing language translation is discussed and described. A determination 702 of a language preference may be made. The language preference sets the native, or target language preference for data displayed on the computer 110. Selection of a target language may be made by obtaining a user selection, e.g. with a simple pop up window. Alternatively, the computer 110 or, more specifically, a program executing on the computer 110, may read a setting made with respect to automatic language translation. In another embodiment, the preferred language may be determined by reading a default language setting for the operating system 144. In yet another embodiment, a selection may be made from those languages installed on the computer. The selection may be tied to a particular user login, such that each user has his or her own language preference, separate from another user.

Data may then be received 704 via a network. The data may be a web page, an electronic mail, a web log, etc. The data may be received in a variety of electronic formats, for example, hypertext markup language (HTML) and may have one or more languages present in its content. In different embodiments, the data, ultimately destined for display to a user, may be initially received at one or more logical processing locations. The data may be received 704 at a client computer, such as computer 12. The data may also be received, in a different embodiment, at a server 30, such as an edge server or a proxy server. In yet another embodiment, the data may be routed to a service provider (not depicted) using a server 30 to process data. Service providers are discussed in more detail below. In yet another embodiment, the data may be received by a peer computer in a peer-to-peer network.

One or more applications may be involved in identifying and processing the data, both before and after the translation. In one embodiment, a web browser may identify the data requiring translation, initiate the translation, manage any necessary user interface, and present the results. In such a case, the user may be presented with a seamless and easy-to-use, if not transparent, translation capability where documents and other information may be translated with a minimum of interaction. Such seamless integration may be ideal for other language-based communications, such as, but not limited to, a word processor, a media player, a presentation manager, an email client or server, etc. In one embodiment, when the necessary preferences have been selected, a user may copy text in a first language, for example from a web page, and paste into a word processor in the target language. As The output of the actual translated data in the target language may accomplished on more than just a display or screen. For example, output may be to a Braille output device, a printer or facsimile machine, a text-to-speech processor, or an audio device, such as a portable media player. Beyond direct output, the translated data may be cached or stored and output when required by either another user requesting the same data or later use by the original requester.

A process receiving the data may identify at least one incoming language in the data and determine 706 whether the incoming language matches the target or preferred language. In another embodiment, a user may participate in the language identification by explicitly identifying the language. The determination 706 may be straightforward, for example, when 100% of the text in a web page is one language and it matches the target language. At other times, the determination 706 may be more complicated, for example, when the text of an article quotes a foreign speaker, or when Latin or French idioms are used, or when the article is in one language and accompanying advertisements are in another language. Algorithmic determinations may be used based on pure percentages of language content, an absolute number of words in one language, etc. Even the determination of what language or languages are present may require analysis, for example, matching words to dictionaries of known or expected languages. Alternately, the data itself may contain metadata that identifies its own incoming language, for example, HTML tags.

When a determination is made at block 706 that language translation may be required for the received data, the yes branch from block 706 may be followed. In the exemplary embodiment shown in FIG. 7, options are presented to the user related to the translation, allowing the user to select 708 from the options presented. In other embodiments, any or all of the selections may have been pre-selected or may revert to default settings. In another embodiment, some selections may be deferred until later in the process.

In general, selections may be made with respect to the need to translate at all, that is, a confidence factor, a translation level, a billing level, and a rating, prescribing what accuracy is acceptable. Each is discussed in more detail below.

The confidence factor may be used to determine whether to continue with translation or bypass it. For example, a few words from a quotation or idiom May result in a confidence factor of 10 out of 100. In other cases, significant portions of content may be in a second language resulting in a higher confidence factor, for example, 85 out of 100. By evaluating the confidence factor, the user may override the decision made at block 706. Consistent overrides may update the confidence factor settings to require a higher threshold, resulting in fewer positive translation selections. Conversely, repeated requests for translation following a display of data not involving translation (see block 720) may result in a lower threshold setting.

The translation level selection relates to how the translation is to be carried out. Several illustrative alternatives are discussed below, although the list is not exhaustive. At a lower end of the translation spectrum, a machine-based translation may be selected. In this case, as with many current free services, a more or less word-by-word replacement is made from the incoming language to the target language. In some cases, predefined phrases may be substituted in the same manner as word-for-word translations. Another option for translation may be a community translation, that is, where the data, in whole or in part is supplied to a number users known to or thought to have knowledge of both the incoming and the target language. The community members may translate part or all of the incoming language content in the data. The translation may be double checked by redistributing the translation among the community for confirmation or correction. If automated, a final selection may be made by comparing a consensus of all received translations. A free service translation may be offered, for example, by a government agency or non-government agency offering a public service, such as expanded Internet access.

A licensed service translation may be available as part of a purchase, for example, as part of an operating system. Similarly, the licensed service translation may be available as part of a subscription service. The licensed service translation may be limited to a certain number of translations, a limited to a number of translations per time period, such as 10 per month, unlimited translations for a time period, or some combination of these.

A sponsored translation may be offered by a company or organization in exchange for viewing, hearing or otherwise participating in advertising associated with sponsoring products, services or announcements. Particularly when advertising is associated with a particular product or service, the translations may be limited to content from a particular category or grouping. An additional translation service may be a paid translation. As may be implied, a paid translation may be offered for translating particular content for either a proscribed amount or by a quote, either may be based on to/from languages and volume. The particular content may be a factor as well, for example, translating a medical journal article may be more expensive than translating an account of a sporting event of similar length.

A rating may be provided for each translation level. The rating may correspond to the accuracy of the translation. With respect to an individual translation, the rating may be automatically generated or, for with more latent data, the rating may be human generated. In another embodiment, the rating may simply provide a way to compare the different translation levels.

In some embodiments, a billing level may be provided for each translation level. The billing level allows a user to base a selection of translation level on the cost, if any, of using the corresponding level. Obviously, some data may be of more value than others, so providing the billing level may allow a user to override a default setting for one or more documents.

Both the billing and the rating may be influenced by the incoming language and the target or preferred language. The target language may often be explicitly known, as discussed above at block 704. However, the incoming language may need to be determined. In one embodiment, a known "palette" of languages may be determined, corresponding to content of interest. When such a palette is available, a number of dictionaries may be used to pattern match words from the data being received. When the words are matched to a threshold level, the incoming language may be assumed. In another embodiment, clues in the data itself may be used for incoming language determination. For example, when the data includes web pages, the web page itself may have language identifiers and font descriptors used in the presentation of the data. Font descriptors are used so the web browser can select the appropriate font for displaying the content. Language identifiers and font descriptors may be used instead of, or supplementary to, a dictionary-based process. In another embodiment, where content servers are employed, the data may be sent to a server where not only the language, but in some cases, the content itself may be matched, allowing faster presentation of the processed data to be presented to the user.

Ultimately, the billing level may be a result of the rating, the incoming language, target language, and the volume or quantity of the data needing translation. The user may be presented with a range of options for selecting the various options that result in the ultimate billing level. In another embodiment, a simple menu may be presented that represents a limited number of selections.

When the selection of options has been completed, or default values accepted, execution may proceed at block 710. When a licensed or fee-based translation level is selected, the program, computer, or system performing the method may confirm the status with respect to license or billing prior to authorizing the translation to proceed. In the case of licensed software, the validity of the license may be confirmed. This may be accomplished by several mechanisms, such as checking a digital signature or by checking with an on-line function related to licensing. When a fee-based translation level is selected, a confirmation of the ability to pay may be made, such as a credit card authorization or a confirmation of funds in a pre-pay account. The funding confirmation may be made at a local account or made over the network, as in the case of a credit card authorization. When the license or payment authorization is made, the process may proceed at block 712.

The incoming language in the data may be translated 712 using the method and options selected at block 708, or using default settings. In some instances, the translation may include virtually all the data, e.g., in an email or a web log. In other cases, for example, a web page, the text may need to be identified using HTML tags and other instructive data. When multiple languages are present, a determination may be made to translate one or more of the languages, rather than all, based on idiomatic usage or other preferences. To illustrate, the translation may include photo captions, but may not include mouse-over data.

The translation may be performed locally, for example, if a machine translation between common languages is selected. More highly rated translations, and/or those with higher volumes of translation may need to processed at a remote device, for example, at a service provider location, illustrated by server 30 of FIGS. 4-6. As discussed above with reference to FIGS. 4-6, the server 30 may receive the data from either the user's machine, represented by computer 12, or from the web host, an edge server, an Internet service provider, etc., represented by web server 34. The full incoming data may be sent to the server 30, or when sent from the computer 12, may only have the specific text or speech to be translated. Other options for data flow in the translation process have been discussed above with respect to FIGS. 3-6.

When the data has been translated and processed data is available for presentation, a fee may be assessed 714 according the selections made at block 708. If, when required, the fee is assessed, the processed data may be presented 716. The presentation of the processed data may be made on a display if text or output to a speaker if audio. In some cases, a specific user may be the audience for the processed data, but in another embodiment, no specific user may be targeted, for example, when presenting a news or sports feed at a public store or entertainment venue.

Because it may be desirable to distinguish between native, i.e., raw data and processed data having translated information, a translation notice may be presented 718 to inform the user that the data has been translated, or in a specific case, translated from a certain language. Thus, a casual user, or other "hands off" user relying on default selections, may be made aware that the data being presented has been altered, perhaps by a party not associated with the creation of the data. This may allow the user to confirm information when, for example, an important decision may be based on the processed data.

Metadata may be attached to the translated, or processed, data. The metadata may represent information associated with both the selection of the translation choices and information about the translation itself. The metadata may include a translation flag, indicating a translation has been performed. The metadata may also include incoming and target language identifiers, the translation service identifier, the translation rating, the translation cost, the translation preparation time, or a certification of accuracy. The metadata may be particularly important for evaluation by a subsequent user, or for billing when replaying cached translated data. Various provisions may be made for outputting the metadata and may be selectable by the user. For example, metadata related to the translation may be presented as a text note, a watermark on the presented material, the tool tip that may appear when the mouse is over the presented material, or an audio alert, such as a beep or spoken warning. Alternately, metadata may be stored in a log or as a property associated with the translated data.

When the incoming language matches the target language, no translation is required, the no branch from 706 may be followed and the data may be presented 720 to the user without additional language processing.

In another embodiment, a computer-readable medium having machine-readable instructions for executing the translation may include a number of software blocks or modules. The software may include a module for receiving a selection of a preferred language and a module for determining an incoming language of received data. When the language determinations are made, a module for evaluating a license validity may be invoked. The process may include a module for translating the incoming language to the preferred language responsive to the module for evaluating license validity and may further include a module for assessing a fee for translating the incoming language to the preferred language. A software module may be activated for receiving a selection of translation level, that is, the accuracy and latency the user wishes in light of possible translation fees. The particular translation module may be selected once the preferred language is selected and the incoming language is determined, as discussed above. When the translation processing cannot be accomplished locally, a module may be activated for sending the received data to a remote device for translating the incoming language to the preferred language. The translation at the remote device may include any translation methodology, including, but not limited to those noted above, such as paid translation, community translations, automated translation, etc.

A toolbar (not depicted) may be made available, providing a selection for turning native language translation off and on. If on, an option is made available for selecting a preferred language, billing level, rating and/or confidence factor. If the option is turned on for the first time, or if the preferences have been lost or disassociated from the application, the user may be prompted to enter a preferred language. Alternatively, the preferred language may default to the current language for the operating system user interface or the default language of a common word processor, such as Microsoft Word. Other discriminators may be set related to other factors. For example, a translation may automatically be triggered if the confidence factor (need for translation) is above 80%, the billing level is below a value threshold, e.g. $0.50, and the rating is above another settable threshold, 80 out of 100. If a criteria is not met, the user may be prompted for manually accept translation.

Integrated native language browsing may open the Internet to entire new populations and allow them exposure to sights, sounds, and knowledge that was previously unavailable. At the same time, integrated native language browsing may bring unique or hard-to-find information to long-time users of the Internet and other information sources by applying the same translation techniques described above. While the Internet, i.e. web-browsing is discussed in the most detail, the concepts discussed above are applicable to other language-based information, for example, real-time translation of non-text streaming content, such as live sporting event descriptions. Application may also be made to real-time translation of text-to-speech processing, such as books and other publications. As computer power increases, translation of speech between languages, even real-time translations may be encompassed by the techniques and processes disclosed herein.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method, performed by a computer executing a web browser, of presenting internet content on a display of the computer in a target human language, the method comprising:
   accessing a language setting indicating a target human language;
   receiving user inputs of arbitrary URLs (Uniform Resource Locators) into the web browser, the URLs identifying arbitrary web pages on the Internet, wherein the web pages comprise text portions for display that are in a same source human language other than the target human language;
   receiving the web pages identified by the URLs;
   as the web pages are received by the computer, before the web pages are displayed on the display of the computing device, automatically responding to receiving the web pages by automatically analyzing the web pages to determine that text for display in the given web page is in a source human language that differs from the target human language according to the language setting, and in response to having so determined, allowing the user to select translation levels of the web pages, respectively, as having either a first translation level or a second translation level corresponding to translation accuracy, and based on the selected translation levels of the web pages automatically selecting from among a first translation service and a second translation service for translation of the web pages, where the first translation service is less accurate than the second translation service at translating from the source human language to the target human language, wherein the first translation service executes locally on the computer and the second translation service executes remotely on one or more servers accessible to the computer via a network, and the first translation service is selected for translation for the web pages with the first translation level and the second translation service is selected for translation for the web pages with the second translation level, and each translation service translates the text in the corresponding web pages to text in the target human language; and
   automatically generating translated versions of the web pages containing translated text in the target language from the first translation service and the second translation service; and
   displaying the translated versions of the web pages on the display of the computing device.

2. The method of claim 1, wherein metadata associated with one of the web pages includes a translation service identifier.

3. The method of claim 1, wherein the computing device comprises a hand held communication device.

4. The method of claim 1, wherein the computing device comprises a personal computer.

5. The method of claim 1, wherein metadata associated with a translated version of a web page includes a translation service rating.

6. A method according to claim 1, further comprising transmitting the text in the source human language of a web page to the remote translation service, and the browser in turn receiving and displaying translated text of the web page received from the remote translation service.

7. One or more tangible computer readable storage media storing information to enable a computer to perform a process on the computer, the process comprising:
   receiving web pages interactively selected, on the computer, for browsing by a user, the web pages comprising arbitrary web pages on the Internet, each web page comprising text for display that is comprised of words in a first human language;
   each time one of the web pages is received by the computer, analyzing the one of the web pages to determine that there is a need for translation and allowing the user to select a translation level of the text for display in the one of the web pages, where for some web pages the user selects a first translation level and for other of the web pages the user selects a second translation level, wherein the first translation level and the second translation level represent different respective translation accuracies for the first human language, and wherein the computer has access to a first translation service and a second translation service, the first translation service having a first rating corresponding to accuracy thereof, the second translation service having a second rating corresponding to accuracy thereof, wherein the first translation service is less accurate than the second translation service at translating from the first human language to the second human language, wherein the first translation service executes locally on the computer and the second translation service executes remotely on one or more servers accessible to the computer via a network;
   responsive to receiving the web pages, to obtain translation thereof, automatically selecting from among the first translation service and the second translation service according to the selected translation levels of the respective analyzed web pages, wherein when a web page has the first translation level according thereto the first translation service is selected and the text for display of the web page is caused to be translated to the second human language by the first translation service, and when a web page has the second translation level according thereto the second translation service is selected and the text for display of the web page is caused to be translated to the second human language by the second translation service such that the computer receives the translated text for display; and
   displaying translated versions of the web pages by the browser, wherein translated versions of the web pages with the first translation level are displayed with text translated locally by the first translation service on the computer, and translated versions of the web pages with the second translation level are displayed with text translated by the remote second translation service.

8. One or more tangible computer readable storage media according to claim 7, wherein the remote second translation service comprises a service where persons manually translate text, and where the text of the other of the web pages displayed by the web browser comprises text translated manually by one or more of the persons.

9. One or more tangible computer readable storage media according to claim 7, the process further comprising receiving a web page in a third human language, determining that the web page in the third human language is to be translated to the second human language, and sending the web page in the third human language to the remote translation service in response to determining that translation of the third human language is not available on the computer.

10. One or more tangible computer readable storage media according to claim 7, wherein one of the web pages with the second translation level is sent to the remote second translation service in response to an automated determination that a cost for translation by the remote second translation service is below a user-settable criteria.

\* \* \* \* \*